US008832951B2

(12) United States Patent
Oode et al.

(10) Patent No.: US 8,832,951 B2
(45) Date of Patent: Sep. 16, 2014

(54) SEPARATION DISTANCE DERIVATION SYSTEM AND THICKNESS GAUGE

(71) Applicant: Fuji Jukogyo Kabushiki Kaisha, Tokyo (JP)

(72) Inventors: Hisayuki Oode, Tokyo (JP); Tatsuo Nakahata, Tokyo (JP); Masao Watanabe, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 72 days.

(21) Appl. No.: 13/745,559

(22) Filed: Jan. 18, 2013

(65) Prior Publication Data

US 2013/0185950 A1   Jul. 25, 2013

(30) Foreign Application Priority Data

Jan. 25, 2012   (JP) ................. 2012-012582

(51) Int. Cl.
*G01B 7/14* (2006.01)
*G01B 5/14* (2006.01)
*G01B 7/06* (2006.01)
*G01B 3/30* (2006.01)
*G01B 3/50* (2006.01)

(52) U.S. Cl.
CPC .. *G01B 7/14* (2013.01); *G01B 7/06* (2013.01); *G01B 5/14* (2013.01); *G01B 3/30* (2013.01); *G01B 3/50* (2013.01); *G01B 2210/58* (2013.01)
USPC .............................. 33/501.45; 33/613; 33/784

(58) Field of Classification Search
CPC .............. G01B 7/14; G01B 7/02; G01B 7/06; G01B 5/14
USPC ................. 33/501.45, 613, 783, 784
See application file for complete search history.

(56) References Cited

U.S. PATENT DOCUMENTS

| | | | | | |
|---|---|---|---|---|---|
| 5,063,687 | A | * | 11/1991 | Olshefsky | 33/827 |
| 5,551,162 | A | * | 9/1996 | Struble | 33/548 |
| 5,657,550 | A | * | 8/1997 | Struble | 33/548 |
| 5,665,973 | A | * | 9/1997 | Christenson | 250/484.2 |
| 6,094,831 | A | * | 8/2000 | Shigyo | 33/542 |
| 6,279,241 | B1 | * | 8/2001 | Chen | 33/501.45 |
| 6,438,859 | B1 | * | 8/2002 | Lynch | 33/613 |
| 6,813,842 | B2 | * | 11/2004 | Wang | 33/501.45 |
| 7,100,298 | B2 | * | 9/2006 | Kiwada et al. | 33/613 |
| 7,134,219 | B2 | * | 11/2006 | Wood et al. | 33/613 |
| 7,188,430 | B2 | * | 3/2007 | Tange | 33/544.4 |
| 7,430,813 | B2 | * | 10/2008 | Park | 33/613 |
| 2006/0220659 | A1 | * | 10/2006 | Konno et al. | 324/662 |

FOREIGN PATENT DOCUMENTS

JP   64-34501 U   5/1989
JP   8-304061 A   11/1996

* cited by examiner

*Primary Examiner* — Christopher Fulton
(74) *Attorney, Agent, or Firm* — McGinn IP Law Group, PLLC

(57) ABSTRACT

There is provided a separation distance derivation system and a thickness gauge. The separation distance derivation system has a thickness gauge that includes: a plurality of blades having first ends inserted between objects; and RFID tags respectively fixed to part of the blades and storing readably thickness information corresponding to the thickness of the respective blades. The separation distance derivation system has also a reading device that includes an RF receiver for establishing contact-less communication with the RFID tags and reading the thickness information, and a controller for summating the thicknesses of the blades, as denoted by the read thickness information, to derive thereby a separation distance.

5 Claims, 6 Drawing Sheets

SEPARATION DISTANCE DERIVATION SYSTEM AND THICKNESS GAUGE

CROSS-REFERENCE TO RELATED APPLICATIONS

The present application claims priority from Japanese Patent Application No. 2012-012582 filed on Jan. 25, 2012, the entire contents of which are hereby incorporated by reference.

BACKGROUND OF THE INVENTION

1. Field of the Invention

The present invention relates to a separation distance derivation system for derivation of a separation distance between objects, and to a thickness gauge that is inserted between the objects.

2. Description of the Related Art

In some instances, the separation distance of gaps that arise, or that are intentionally provided, between objects in structures and machinery and equipment, is measured, with high precision and at a high resolution of 0.01 mm. However, in some instances it is not possible to simply use a distance-measuring tool such as a caliper or the like if the separation distance of a gap to be measured is narrow.

In capacitive GAP measuring instruments, for instance, separation distances can be obtained by inserting a thin sheet-like probe into a gap between objects, causing current to flow between the objects and an electrode (probe), and measuring the voltage at that time. However, accurate separation distances have been difficult to obtain using such measuring instruments in cases where, for instance, the thickness of the probe and the position of the probe between objects, among other parameters, are subjected to numerous limitations, or instances where objects are not conductors, for instance in the case of carbon-fiber reinforced plastic (CFRP).

A technology has been disclosed (for instance, in Japanese Unexamined Patent Application Publication No. H8-304061), in which the leading end of a guide bar is shaped in the form of a wedge, and the latter is inserted into a gap between objects, such that the separation distance is obtained on the basis of the insertion length at which the wedge moves no further. This technology does not depend on the material of the objects; however, the technology allows only measuring the separation distance of the opening (inlet) of the gap between the objects. The measurement result was in some instances different from the substantial separation distance between opposing planes in the gap.

Therefore, thickness gauges are used that allow obtaining the substantial separation distance of the gap between the objects, without limitation on the material of the objects, in cases where a separation distance is to be measured with high resolution and high precision (for instance, Japanese Unexamined Utility Model (Registration) Application Publication No. S64-34501). In such a thickness gauge, the separation distance can be obtained by inserting a plurality of plate-like blades, of known thickness, between objects, and by summating then the thicknesses of the plurality of inserted blades. Another known technology for preventing human error involves measuring the separation distance all at once, using a caliper, with the blades inserted in the gap, instead of through summation of the thicknesses of the plurality of blades.

In the above-described technology that utilizes concomitantly a thickness gauge and a caliper, a number of blades in a plurality of bundled blades, as the thickness gauge, are selectively inserted between the objects, and hence alternate blades are selected, i.e. first blade, fifth blade and ninth blade, depending on the separation distance between the objects. Therefore, when the caliper was applied, with the blades inserted in the gap, a concern arose in that the caliper might derive a separation distance that was greater than the actual separation distance in proportion to a gap that may arise between the inserted blades at sites other than the insertion portion.

SUMMARY OF THE INVENTION

In the light of the above, it is an object of the present invention to provide a separation distance derivation system, and a thickness gauge, that make it possible to obtain, easily and accurately, a substantial separation distance of a gap between objects, while avoiding human error.

An aspect of the present invention provides a separation distance derivation system that derives a separation distance between objects by using a thickness gauge that is inserted between the objects and a reading device. The thickness gauge includes: a plurality of blades having first ends inserted between the objects; and RFID tags respectively fixed to part of the blades, with these RFID tags readably storing thickness information corresponding to the thickness of the respective blades, and the reading device having: an RF receiver for establishing contact-less communication with the RFID tags and reading the thickness information; and a controller for summating the thicknesses of the blades, as denoted by the read thickness information, to derive thereby the separation distance.

Another aspect of the present invention provides a thickness gauge that has a plurality of blades having first ends inserted between the objects; and RFID tags respectively fixed to part of the blades. These RFID tags readably store thickness information corresponding to the thicknesses of the respective blades.

Through-holes may be provided respectively in the plurality of blades, the thickness gauge may further have a pivot pin inserted through the through-holes of the plurality of blades, with the plurality of blades being able to pivot about the pivot pin.

The plurality of blades may be configured in which central angles, centered on the pivot pin and formed by a connection extending from the pivot pin to the first end of each of the blades and by a connection extending from the pivot pin to the RFID tags, may be identical to one another and in which distances between the pivot pin and the RFID tags may be identical to one another.

The blades may be formed of a conductor, and the RFID tags may be fixed at a position at which the conductor is absent in at least one direction.

The present invention makes it possible to obtain, easily and accurately, a substantial separation distance of a gap between objects, and to enhance convenience and work efficiency, while avoiding human error.

DESCRIPTION OF THE PREFERRED EMBODIMENTS

Figure 1:
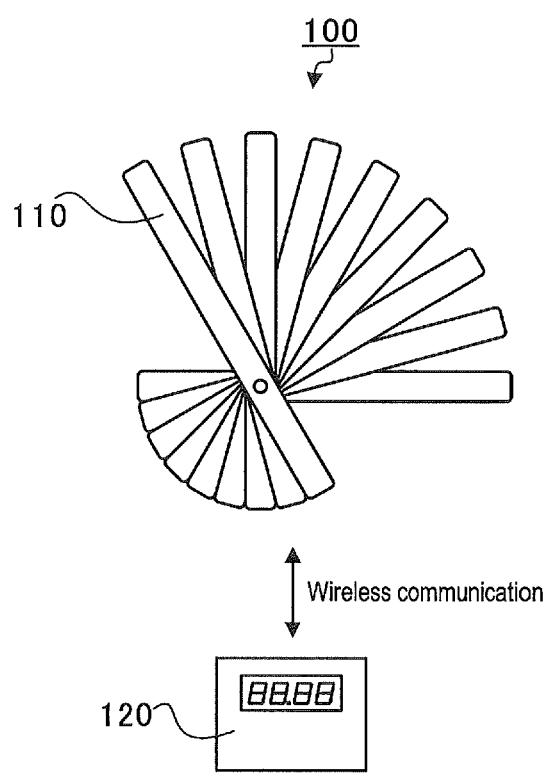
FIG. 1 is an explanatory diagram for explaining the schematic function of a separation distance derivation system.

Preferred embodiments of the present invention are explained in detail below with reference to accompanying drawings. The dimensions, materials and other specific numerical values set forth in the embodiments are given merely by way of illustration in order to make the invention easier to comprehend, and, unless explicitly stated, are not meant to limit the present invention in any way. In the present description and the drawings, elements that have substantially the same function and configuration are denoted by the same reference numerals, and a recurrent explanation thereof will be omitted. Elements that are not directly related to the present invention are not depicted in the drawings.

(Separation Distance Derivation System 100)

FIG. 1 is an explanatory diagram for explaining the schematic function of a separation distance derivation system 100. As FIG. 1 shows, the separation distance derivation system 100 is made up of a thickness gauge 110 and a reading device 120. The present embodiment aims at measuring, with high resolution and high precision, the separation distance of the gaps that arise, or are intentionally provided between objects, in structures (buildings) and machinery and equipment (aircraft, automobiles, marine vessels). Conceivable examples of object gaps, include, for instance, gaps in pistons, cylinders and exteriors (for instance, carbon-fiber reinforced plastic), as well as gaps between iron cores and coils in generators, electric motors and the like. The separation distance derivation system 100 measures mainly gaps between opposing planes in the object.

The thickness gauge 110 is a tool such that a part whereof (blade) is inserted between objects to measure, with high resolution and high precision, the substantial separation distance between the objects. The reading device 120 establishes wireless communication with the thickness gauge 110, and derives automatically the separation distance on the basis of which blades, and how many, are inserted. The thickness gauge 110 and the reading device 120 are explained in detail further on.

(Thickness Gauge 110)

Figure 2:
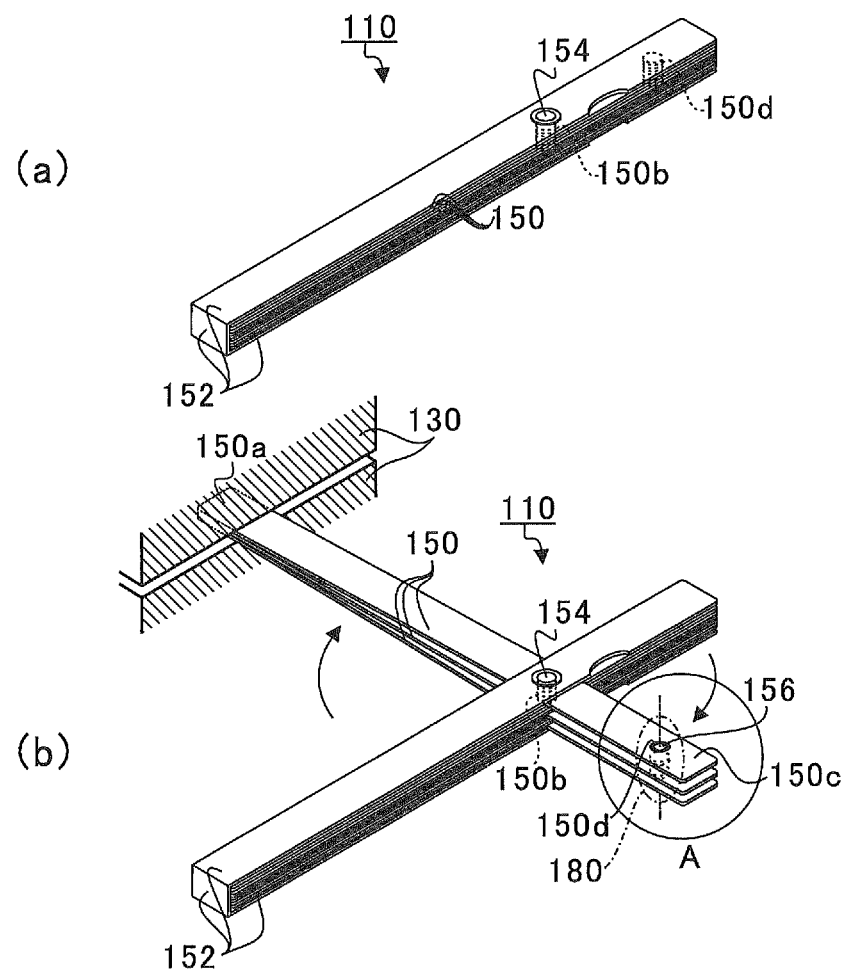
FIGS. 2a and 2b are a set of external-view diagrams for illustrating the configuration of a thickness gauge.

FIG. 2 is a set of external-view diagrams for illustrating the configuration of the thickness gauge 110. In particular, FIG. 2A illustrates a housed configuration and FIG. 2B illustrates a configuration during measurement. The thickness gauge 110 is made up of blades 150, a folder 152, a pivot pin 154, and a radio frequency identification (RFID) tag 156.

For instance, the blades 150 are each formed as a thin metal plate of thickness ranging from 0.01 mm to 1.00 mm, and are ordinarily prepared as a plurality thereof in one thickness gauge 110. A plurality of combinations of such metal plates allows for instance expressing thicknesses ranging from 0.01 mm to 1.00 mm with a resolution of 0.01 mm. The thickness of the metal plate need not necessarily be dissimilar for each blade 150. The blades may have thus identical thickness.

The blades 150 are formed of pliable thin metal plates of identical length. Therefore, as FIG. 2B shows, a plurality of blades 150 (hereafter also referred to as selected blades 150) that is selected out of the prepared blades 150 is bent in the thickness direction. First ends 150a of respective blades 150 can thus be superposed on each other. The measurer selects a combination of blades 150 that correspond to the gap between the objects 130, superposes the first ends 150a by swiveling only the selected blades 150, as denoted by the arrow in FIG. 2B, and inserts the superposed blades 150 (selected blades 150) into the gap. The measurer modifies the combination of blades 150 if the thickness of the superposed blades 150 and the gap do not match each other.

Through-holes 150b for insertion of a below-described pivot pin 154 are provided in the blades 150. The through-holes 150b are formed in such a manner that the positions thereof are identical across the blades 150.

For instance, through-holes having a diameter of 5 mm, or grooves (hereafter simply through-holes 150d), for fixing the RFID tags 156, are provided in second ends 150c of the blades 150. The through-holes 150d may have any shape, for instance circular, rectangular or the like, so long as the RFID tags 156 can be fixed therein.

The folder 152 is formed through bending of a metal plate to a C-shape, in such a manner that the ends of the metal plate oppose each other. As illustrated in FIG. 2A, the folder 152 accommodates the prepared plurality of blades 150. The pivot pin 154 is formed as a long pin the length whereof corresponds to the thickness of the thickness gauge 110, such that the pivot pin 154 runs through the through-holes 150b of the blades 150, with the blades 150 accommodated in the folder 152. The blades 150 can pivot thus about the center of the pivot pin 154, as illustrated in FIG. 2B.

The RFID tags 156, which are wireless ICs having for instance a thickness of 0.8 mm or less (the thinner the RFID tags 156, the more preferable the latter are), are fixed in the through-holes 150d that are formed in the blades 150. Thickness information corresponding to the thickness of respective blades 150 is stored, readably by contact-less wireless communication, in the RFID tags 156. The thickness information may be information that directly denotes the thickness, for instance 0.01 mm or 0.10 mm, or may be information that denotes indirectly the thickness, for instance an identifier or the like of the respective blade 150, so long as a correspondence relationship therebetween is defined in the below-described reading device 120. Herein, the term contact-less indicates that wireless communication can be established both in a contact state and in a non-contact state.

The RFID tags 156 include active-type and passive-type tags. Passive-type tags that take up a small volume are used in the present case, but active-type tags are not ruled out. Passive-type RFID tags 156 have ordinarily no built-in batteries, and operate using an energy source in the form of radio waves that are received from the below-described reading device 120. The thickness information is transmitted to the reading device 120 through superposition (reflection) of a modulated signal of the thickness information onto the portion of an unmodulated carrier of radio waves from the reading device 120.

The RFID tags 156 are fixed to the blades 150 by, for instance, being adhered to a plastic film that is disposed on the rear side of the through-holes 150d that are formed in the blades 150, or by molding, using a resin or the like, with the RFID tags 156 embedded in the through-holes 150d. Preferably, the plastic film, resin or the like has low conductivity (is non-shielding) and elasticity.

(Reading Device 120)

Figure 3:
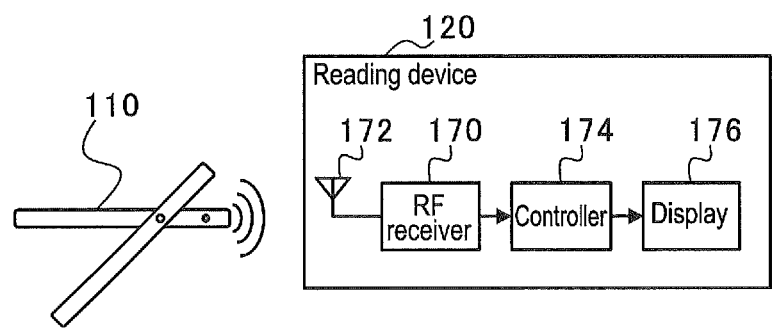
FIG. 3 is a block diagram that illustrates the function of a reading device.

FIG. 3 is a block diagram that illustrates the function of the reading device 120. The reading device 120 comprises an RF receiver 170, a reading antenna 172, a controller 174 and a display 176.

When the measurer brings the reading antenna 172 close to the second ends 150c of the blades 150 of the thickness gauge 110, the RF receiver 170 establishes wireless communication, all at once, with the plurality of RFID tags 156 that are fixed to the plurality of blades 150, by way of the reading antenna 172, by electromagnetic induction at 130 to 135 kHz, 13.56 MHz or the like, or by radio waves of 433 MHz, 900 MHz, 2.45 GHz or the like. Establishment of wireless communication is described in detail further on.

The controller 174 controls the entirety of the reading device 120 by way of semiconductor integrated circuits that include, for instance, a central processing unit (CPU), a ROM that stores programs and the like, and a RAM that serves as a work area. By way of the RF receiver 170, the controller 174 summates the thicknesses of the blades 150, as indicated by the read thickness information, to derive thereby the separation distance of the objects 130. Such a configuration allows performing, easily and accurately, the summation calculation, which is cumbersome for numerical values that include the number of digits that is difficult to grasp, e.g., values including decimal points. Human error can be avoided thereby.

The type and thickness of the selected blades 150, and the total value thereof (separation distance) are all digitized. Accordingly, the information can be stored in a storage medium along with the date and time, and can be forwarded to the exterior via some other communication scheme. This enables, for instance, statistical processing and the like relating to the objects and the time and date.

The display 176, which is made up of a liquid crystal display, an organic electro luminescent (EL) display or the like, displays the separation distance as derived by the controller 174.

(Establishment of Wireless Communication)

The establishment of wireless communication is described in detail next. So-called RFIDs enable omni-directional wireless communication in the order of several cm to several m. In the present embodiment, however, the thickness of the selected blades 150 alone is to be grasped from among the prepared blades 150. Therefore, wireless communication is to be established with only the RFID tags 156 that are formed in the selected blades 150 and that are within a predetermined range 180 denoted by the dashed line in FIG. 2B. Therefore, the reading antenna 172 of the reading device 120 is configured to have directionality so as to enable wireless communication with only those RFID tags 156 that are present within the predetermined range 180; alternatively, the intensity of the radio waves is adjusted and the communication range of the reading antenna 172 is limited to the predetermined range 180.

The relationship between the first ends 150a of the blades 150 and the RFID tags 156 is set up as described below, in such a manner that, during measurement, the RFID tags 156 that are fixed to the second ends 150c of the blades 150 are present within the predetermined range 180, in a state where the first ends 150a of the blades 150 are pinched between objects. Specifically, the central angles, centered on the pivot pin 154, that are formed by wire connections to the first ends 150a of the blade 150 extending from the pivot pin 154 and the wire connections to the RFID tags 156 extending from the pivot pin 154, are set to be equal, and likewise, and the distances between the pivot pin 154 and the RFID tags 156 are likewise set to be equal, across the blades 150. In the present embodiment, as illustrated in FIG. 2B, the central angles formed by the wire connections from the pivot pin 154 to the first ends 150a of the blades 150 and the wire connections from the pivot pin 154 to the RFID tags 156 are all 180-degree angles, and the distances from the pivot pin 154 to the RFID tags 156 in the blades 150 are likewise equal.

As a result, when the plurality of blades 150 that are inserted between the plurality of objects, from among the plurality of blades 150, is superposed in the thickness direction, the RFID tags 156 of the respective superposed blades 150 become likewise superposed in the thickness direction. Therefore, all the RFID tags 156 of the selected blades 150 can be kept within the predetermined range 180 with respect to the reading antenna 172 of the reading device 120.

Figure 4:
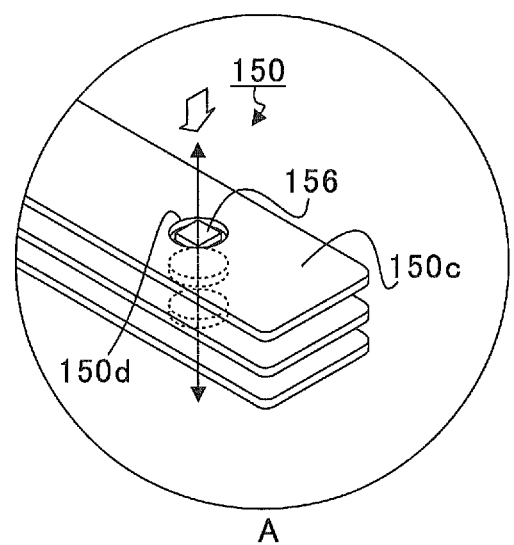
FIG. 4 is an enlarged diagram of portion A in FIG. 2B.

FIG. 4 is an enlarged diagram of portion A in FIG. 2B. The surroundings of the RFID tags 156 are configured as described below in such a way so as to enable wireless communication, with good efficiency, between the reading antenna 172 and the RFID tags 156 superposed as described above. Specifically, the blades 150 are formed of a conductor, such as a metal or the like and the RFID tags 156 are fixed at a position at which the conductor is absent in at least one direction. In the present embodiment, the blades 150 are formed of a metal, which is a conductor; also, the through-holes 150d are formed in the direction at which the RFID tags 156 overlap (thickness direction of the blades 150), as indicated by the arrow in FIG. 4. Therefore, the overlapping RFID tags 156 form a passageway for radio waves only in the thickness direction of the blade 150, while being surrounded by conductors in the length direction and the width direction of the blades 150. Therefore, the reading device 120 can establish wireless communication reliably in the direction denoted by the white arrow in FIG. 4. If the RFID tags 156 have directionality, that direction may overlap the direction (thickness direction of the blades 150) at which the conductors are absent.

By virtue of such a configuration, the reading antenna 172 can establish reliably wireless communication only with the plurality of targeted RFID tags 156, and a shield can be formed between the plurality of targeted RFID tags 156 and other RFID tags 156 that are fixed to non-selected blades 150. Therefore, no erroneous wireless communication is established, and, accordingly, there can be efficiently aggregated the thickness information of the target RFID tags 156 alone, and the separation distance can be worked out accurately.

As described above, the passive-type RFID tags 156 transmit the thickness information to the reading device 120 through superposition (reflection) of a modulated signal of the thickness information onto the portion of the unmodulated carrier of radio waves from the reading device 120. Upon measurement, therefore, the plurality of RFID tags 156 reacts all at once with the radio waves of the reading device 120. In the separation distance derivation system 100, accordingly, thickness information can be acquired all at once by relying on various techniques, for instance setting communication frequencies dissimilar from those of the RFID tags 156, and establishing time-division wireless communication, by varying the communication frequency, or by setting dissimilar timings at which the modulated signal is superposed on the portion of the unmodulated carrier of the radio waves from the reading device 120.

(Separation Distance Derivation Method)

Figure 5:
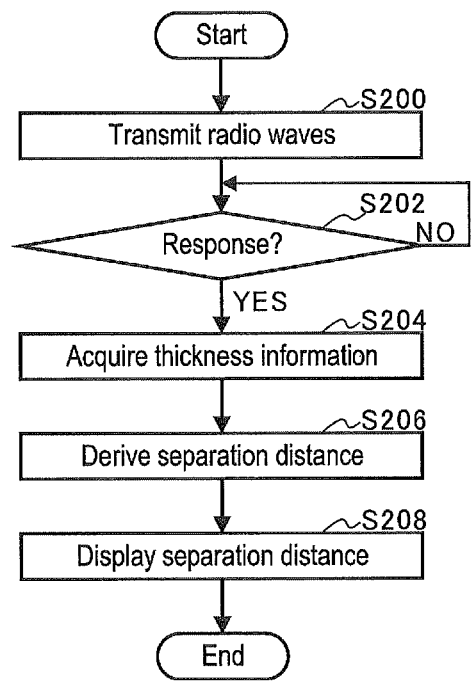
FIG. 5 is a flowchart illustrating the flow of a separation distance derivation method that utilizes a thickness gauge and a reading device.

FIG. 5 is a flowchart illustrating the flow of a separation distance derivation method that utilizes the thickness gauge 110 and the reading device 120. The measurer selects one or a plurality of blades 150, from the thickness gauge 110, in accordance with the separation distance of the objects 130, and inserts the plurality of blades 150 between the objects 130. When the thickness of the overlapping blades 150 matches the separation distance, the measurer brings the reading device 120 close to the second ends 150c of the inserted blades 150 in such a manner that the reading antenna 172 becomes positioned in the thickness direction of the blades 150.

By way of the RF receiver 170, the reading device 120 transmits radio waves that comprise information for reading the thickness information (S200), and determines whether or not there is a response from the RFID tags 156 (S202). The reading device 120 repeats this response determination until there is a response from the RFID tags 156 (NO in S202). When there is a response (YES in S202), the reading device 120 reads the thickness information by way of the RF receiver 170 (S204).

Upon reading of the thickness information, the controller 174 summates the thickness of each of the blades 150 as denoted by the read thickness information, to derive thereby the separation distance of the objects 130 (S206). The display 176 displays the separation distance derived by the controller 174 (S208).

Through the use of the thickness gauge 110, the separation distance derivation system 100 and the separation distance derivation method explained above make it possible to obtain, easily and accurately, a substantial separation distance of a gap between objects. Also, the thickness information of the blades 150 can be acquired easily and reliably by way of the RFID tags 156, while human error can be avoided through automatic calculation by the reading device 120. Measurement of the separation distance can be rendered thus more convenient, while affording greater work efficiency.

Preferred embodiments of the present invention of have been explained above with reference to accompanying drawings, but the present invention is not meant in any way to be limited to these embodiments. It will be apparent to a person skilled in the art that various modifications and alterations can be conceivably made without departing from the scope of the present invention. It is understood that such modifications and alterations belong, as a matter of course, to the technical scope of the present invention.

Figure 6:
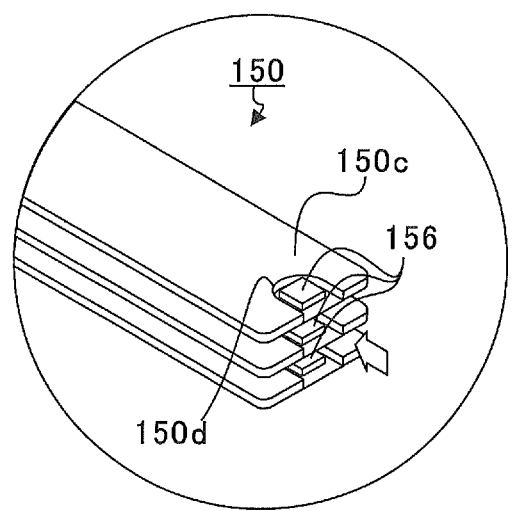
FIG. 6 is an explanatory diagram for explaining another structure of the blades.

In the above-described embodiment, for instance, the direction in which conductors are absent is the thickness direction of the blades 150, but, as illustrated in FIG. 6, a cutout may be provided instead in the second ends 150c of the blades 150, in the length direction of the latter, such that the RFID tags 156 are fixed in that cutout. In that case, the reading antenna 172 establishes wireless communication in the length direction of the blades 150, as indicated by the white arrow in FIG. 6. As a result, the thickness direction of the blades 150 can be covered by conductors, and contact between the measurer and the RFID tags 156 can be avoided.

In the above-described embodiment, an example has been explained in which the plurality of blades 150 is accommodated in the folder 152, but the folder 152 need not be provided; also, the plurality of blades 150 may be connected to the pivot pin 154, or the blades 150 may be used independently from each other.

Processing in the various steps in the separation distance derivation method of the present description need not necessarily be carried out in a time series according to sequence set forth in the flowchart, and may be carried out in parallel or in subroutines.

The present invention can be used in a separation distance derivation system for derivation of a separation distance between objects, and in a thickness gauge that is inserted between objects.

What is claimed is:

1. A separation distance derivation system for deriving a separation distance between objects by using a thickness gauge, which is inserted between the objects, and a reading device,
   the thickness gauge having:
   a plurality of blades having first ends inserted between the objects; and
   RFID tags respectively fixed to part of the blades, these RFID tags readably storing thickness information corresponding to the thicknesses of the respective blades, and
   the reading device having:
   an RF receiver for establishing contact-less communication with the RFID tags and reading the thickness information; and
   a controller for summating the thicknesses of the blades, as denoted by the read thickness information, to derive thereby the separation distance.

2. A thickness gauge, comprising:
   a plurality of blades having first ends inserted between the objects; and
   RFID tags respectively fixed to part of the blades, the RFID tags readably storing thickness information corresponding to the thicknesses of the respective blades.

3. The thickness gauge according to claim 2, wherein through-holes are provided respectively in the plurality of blades,
   the thickness gauge further comprising a pivot pin inserted through the through-holes of the plurality of blades,
   with the plurality of blades being able to pivot about the pivot pin.

4. The thickness gauge according to claim 3, wherein the plurality of blades are configured in which central angles, centered on the pivot pin and formed by a connection extending from the pivot pin to the first end of each of the blades and by a connection extending from the pivot pin to the RFID tags, are identical to one another and in which distances between the pivot pin and the RFID tags are identical to one another.

5. The thickness gauge according to claim 4, wherein the blades are formed of a conductor, and
   the RFID tags are fixed at a position at which the conductor is absent in at least one direction.

* * * * *